(12) United States Patent
Bourne et al.

(10) Patent No.: US 7,716,078 B2
(45) Date of Patent: May 11, 2010

(54) SYSTEM AND METHOD FOR WEB-BASED SPORTS EVENT SCHEDULING

(75) Inventors: Mary Lou Garber Bourne, Harrisonburg, VA (US); Jeffrey Thomas Bourne, Harrisonburg, VA (US)

(73) Assignee: Intercollegiate Sports Scheduling, LLC, Harrisonburg, VA (US)

( * ) Notice: Subject to any disclaimer, the term of this patent is extended or adjusted under 35 U.S.C. 154(b) by 0 days.

(21) Appl. No.: 11/819,436

(22) Filed: Jun. 27, 2007

(65) Prior Publication Data

US 2008/0010106 A1    Jan. 10, 2008

Related U.S. Application Data

(60) Provisional application No. 60/817,780, filed on Jun. 30, 2006.

(51) Int. Cl.
G06F 9/46 (2006.01)
(52) U.S. Cl. .......................................... 705/9
(58) Field of Classification Search ...................... 705/9
See application file for complete search history.

(56) References Cited

U.S. PATENT DOCUMENTS

| | | | | |
|---|---|---|---|---|
| 4,832,346 A | * | 5/1989 | Pierce | 273/247 |
| 6,443,838 B1 | * | 9/2002 | Jaimet | 463/16 |
| 6,526,285 B1 | * | 2/2003 | Matsumoto et al. | 455/457 |
| 6,714,916 B1 | | 3/2004 | Robertson et al. | |
| 7,001,279 B1 | * | 2/2006 | Barber et al. | 463/42 |
| 7,082,402 B2 | * | 7/2006 | Conmy et al. | 705/8 |
| 7,188,073 B1 | * | 3/2007 | Tam et al. | 705/9 |
| 7,614,944 B1 | * | 11/2009 | Hughes et al. | 463/4 |
| 2006/0030407 A1 | * | 2/2006 | Thayer | 463/42 |

OTHER PUBLICATIONS

Notification of Transmittal of International Search Report and Written Opinion of the International Searching Authority, or the Declaration, International Search Report and Written Opinion of the International Searching Authority, all mailed Sep. 3, 2008.

* cited by examiner

*Primary Examiner*—Romain Jeanty
(74) *Attorney, Agent, or Firm*—McGuireWoods LLP

(57) ABSTRACT

A system and methods are provided for communication between entities that need to coordinate on scheduling events. Communication between schedulers, such as coaches, athletic administrators or organization administrators who may be in charge of a multiplicity of sports or activities at institutions, such as colleges or universities, who need to connect and communicate on a particular task. These tasks may include scheduling of events such as sports competitions or other events or activities in which there may be shared or common interests or a shared network of users, players or participants. Search by criteria to find matching potential opponents for scheduling events is also provided. Automatic schedule updates are maintained, typically in a logically centralized database, facilitated by a messaging system to facilitate ease of scheduling.

25 Claims, 19 Drawing Sheets

SYSTEM AND METHOD FOR WEB-BASED SPORTS EVENT SCHEDULING

CROSS REFERENCE TO RELATED APPLICATIONS

This application claims benefit and priority to U.S. Provisional Application No. 60/817,780 filed on Jun. 30, 2006, which is incorporated by reference herein in its entirety.

DESCRIPTION

1. Field of the Invention

The invention generally relates to a system and method to schedule events, and more particularly, to a system and method for scheduling events including sports events among entities such as organizations that may have limitations for scheduling, such as geographical requirements, constraints by timing, conflicts, availability, or other factors.

2. Background of the Invention

In the course of sports programs or institutions scheduling out of conference or out of division competitions, coaches and/or athletic administrators communicate through several methods of communication: by phone to try to reach the person in charge of scheduling and mass faxes and electronic mail announcements from an institution or through their conference office to other conference offices. The conference offices in turn typically forward the broad announcement to their member institutions. This is extremely time-consuming to relay the message for scheduling a game or event on a particular calendar date. There are also time delays in responding to phone calls and e-mails. The process of communicating takes more time than it should and is a burden experienced by those who are tasked with finding non-conference/non-division games.

SUMMARY OF THE INVENTION

The invention satisfies the foregoing needs and avoids the drawbacks and limitations and frustrations of the prior art, and provides a better, more timely and effective process of communication to schedule and coordinate events by utilizing an on-line, network or Internet-based application.

In one aspect, a method for scheduling events including the steps of creating a schedule database for each of one or more events associated with each of a plurality of differing entities, searching for at least one of the plurality of differing entities based on criteria, and updating the schedule database to indicate an agreement between two of the plurality of differing entities to conduct an event on an agreed upon date and location, wherein the database is accessible by the plurality of differing entities over a network.

In another aspect, a system for scheduling events is provided that includes means for providing a display of current schedules for at least two institutions based on information at a logically centralized database, means for dynamically searching for an available time slot in the current schedules that are mutually available producing one or more results, means to extend an offer electronically from one of the at least two institutions to at least the other institution based on the one or more results of the dynamic searching, means to accept the extended offer, and means to update the logically centralized database to synchronize the current schedules based on the accepted offer in substantially real-time.

In yet another aspect, a system for scheduling events between institutions that includes at least one software component embedded in a computer readable medium, wherein the at least one software component is operationally executable by a plurality of users and configured to present an interface for users to execute the following selectable functional operations: a schedule manager that is configured to receive search criteria related to a specific event comprising any one of a conference, a sport, and an institution, and to display a schedule based on the search criteria and to maintain a database of a plurality of events including the specific event, a game search function that searches for and returns results related to the event that identifies one or more potential entities based on selected criteria related to any one of: geography, power rating, ranking, organization, conference sport and specific dates; and a game scheduler function to schedule a game based an the returned results.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings:

FIG. 12 is an embodiment of a graphical user interface (GUI) for adding a game to the schedule manager, according to principles of the invention;

FIG. 15 is an embodiment of a graphical user interface (GUI) for search results of opponents, according to principles of the invention.

DETAILED DESCRIPTION OF EMBODIMENTS OF THE INVENTION

Figure 1:
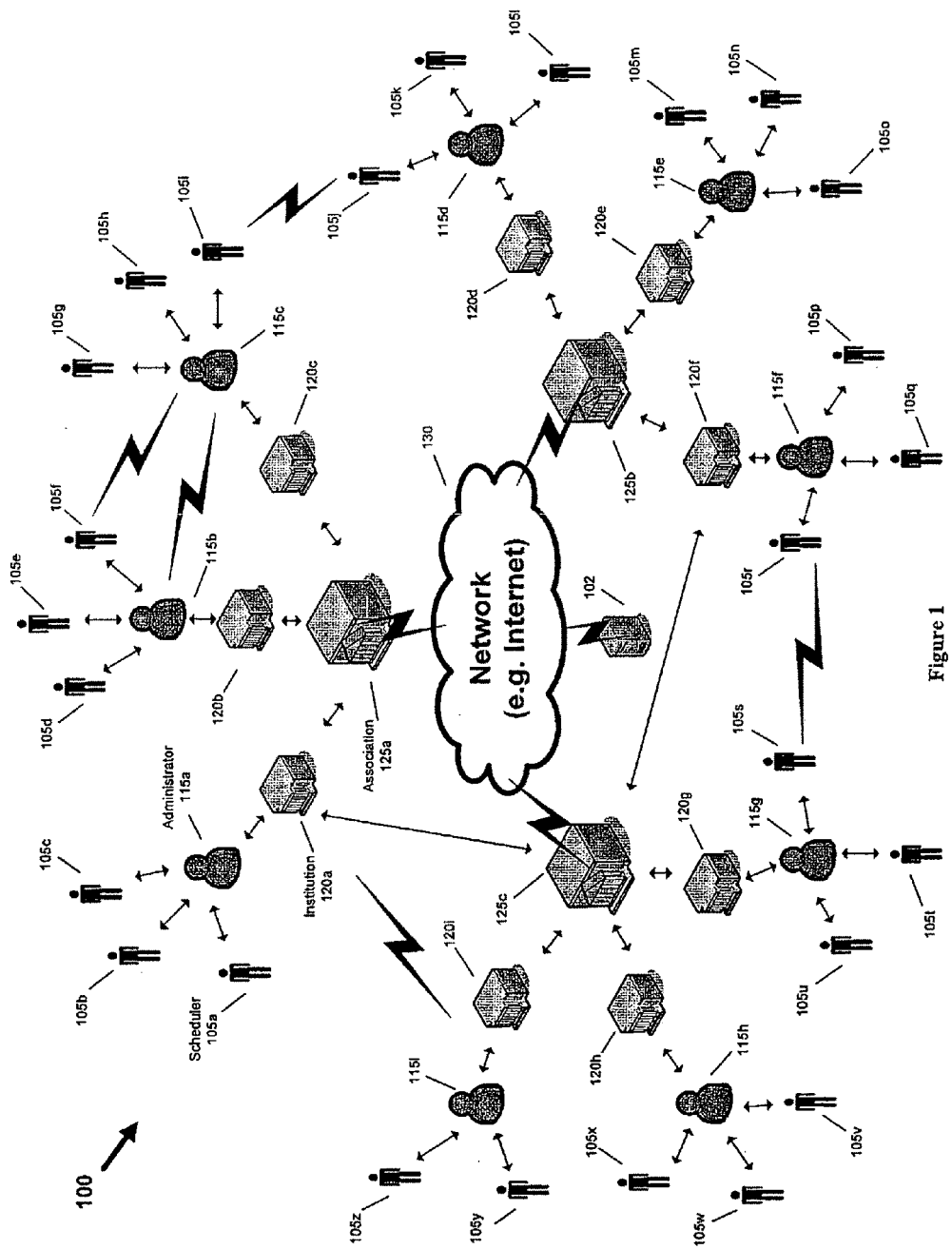
FIG. 1 is a functional block diagram of an exemplary system of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

It is understood that the invention is not limited to the particular methodology, protocols, devices, apparatus, materials, applications, etc., described herein, as these may vary. It is also to be understood that the terminology used herein is used for the purpose of describing particular embodiments only, and is not intended to limit the scope of the invention. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which this invention belongs. Preferred methods, devices, and materials are described, although any methods and materials similar or equivalent to those described herein can be used in the practice or testing of the invention.

The invention is generally directed to a system and methods that provides for communication between entities that need to coordinate on scheduling events. FIG. 1 is a functional block diagram of an exemplary system of the invention, generally denoted by reference numeral 100. The embodiment, as shown in FIG. 1, provides communication directly between schedulers ("scheduler") 105a-105z who are people, such as coaches or operations personnel typically in charge of at least one sport or activity. Organization administrators, such as but not limited to athletic administrators (administrator) 115a-115c are generally in charge of a multiplicity of sports or activities at institutions 120a-120i, which may include, but not limited to, colleges and universities, clubs, professional or amateur programs, or other programs who need to connect and communicate regarding various tasks. These other programs may include scheduled events (SE) such as sports competitions or other events or activities (such as academic teams or club events) which there may be shared or common interests or a shared network of users, players or participants. This may include secondary-like schools such as high schools or prep-schools. Schedulers 105a-105z or administrators 115a-115c or institutions 120a-120i may be associated with a group referred herein as Associations 125a-125c which includes a central office as a coordinating body of institutions or group of organizations or entities such as a conference office which serves as an umbrella organization that might include schedulers 105a-105z for their member institutions within the Association. Schedulers 105a-105z and Associations 125a-125c may be interconnected by a network 130, which may be the Internet or similar global computer network architecture. A server 102 may host the software for implementing the operational features of many of the features, often in conjunction with computing devices 205, according to principles of the invention. The server 102 typically employs a logically centralized database for maintaining information related to features and functions provided by the system and method of the invention. A logically centralized database may include physically distributed databases that are accessible as if it were a centralized database. A centralized database is also contemplated. Each scheduler 105a-105z may communicate directly with other schedulers 105a-105z, and each Association 125a-125c may communicate with their associated schedulers 105a-105z and/or administrators 115a-115c regarding scheduling events or changing scheduled events.

Certain aspects of the invention provide for a network of schedulers 105a-105z to be enabled to come together in a virtual environment and share a common interface and a logically centralized database whereby it is possible for scheduler 105a, for example, to communicate directly with scheduler 105z who may not be a member of scheduler 105a's Association 125a. The logically centralized database is typically populated from decentralized information originating substantially from the institutions and Associations themselves, but may be originated from other sources. It is usually not necessary for the scheduler to know the contact name or e-mail address or phone number of any other scheduler, just the institution with whom they wish to communicate. Furthermore, an institution 120a-120c may be associated with a single or a multiplicity of Associations 125a-125c based on the specific sport, function, or activity.

Figure 2:
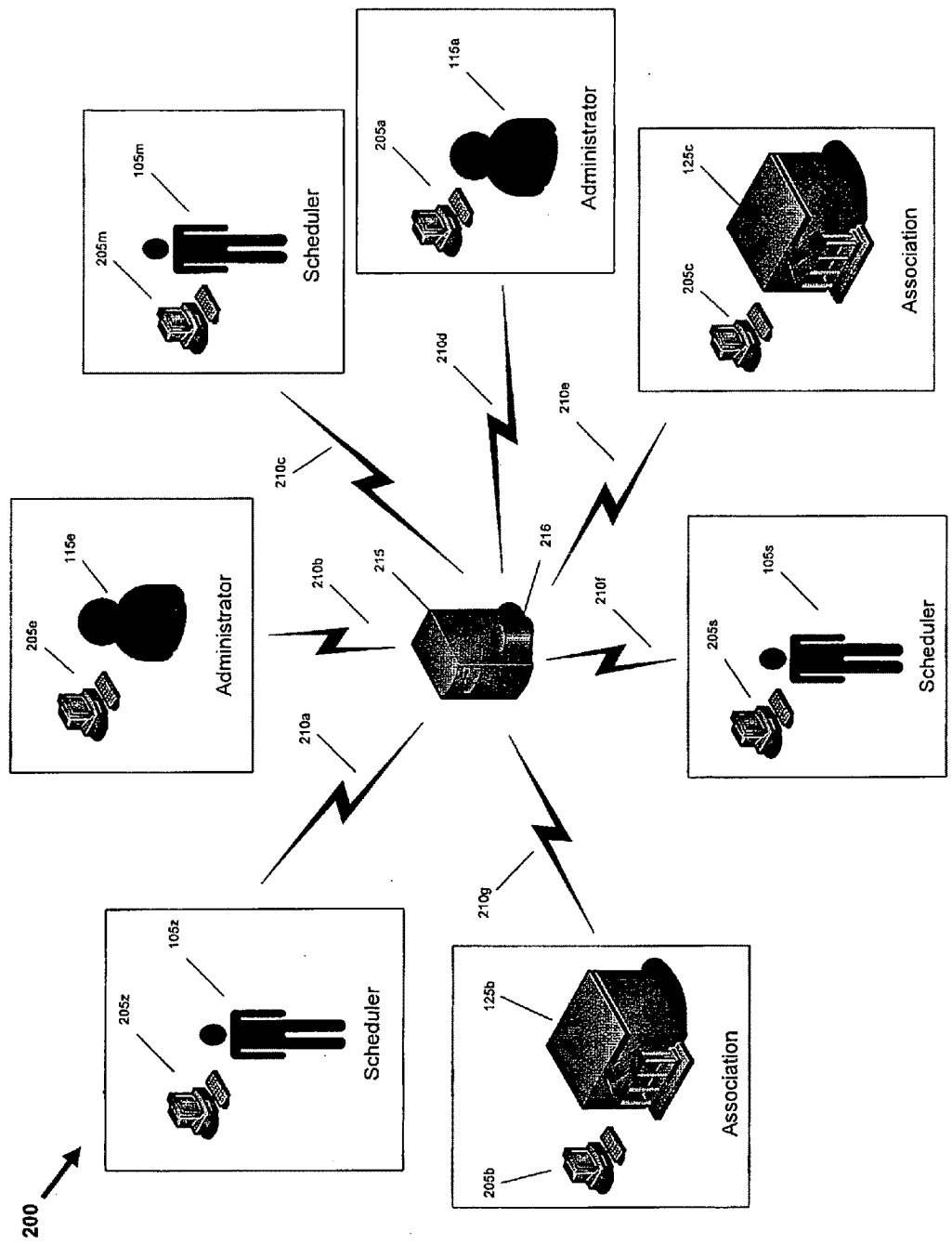
FIG. 2 is a functional block diagram of an embodiment of computer architecture for supporting interoperability such as a peer to peer network, and associated operations for on-line user interactions, according to the principles of the invention.

FIG. 2 is a functional block diagram of an embodiment of computer architecture for supporting network and associated operations for on-line user interactions, generally denoted as reference numeral 200. This network may include the Internet and/or peer-to-peer operational functionality. A skilled artisan would recognize that other architectures may be possible and may be used with the invention and that this illustrative embodiment presents just one basic example.

The architecture 200 also includes appropriate software for such functions as communications, web services, transactional processing and database management. By way of example, scheduler 105m may employ a computing device 205m, such as a personal computer or hand-held network (such as a personal digital assistant or cell phone) or Internet device, to establish a session 210c to access a web site that provides operational functionality in accordance with principles of the invention, and to access data residing in a server or servers 215 (which may include a database to maintain information related to operations of the system), typically using a browser, to initiate transactions or check for activity in their account. The server 215 may be in communication with a logically and/or physically centralized database 216 that maintains information to facilitate scheduling functionality in accordance with principles of the invention.

Similarly, administrators 115*a* and 115*e* (FIG. 2), and Associations 125 B and 125*c* (FIG. 2) may use a personal computing device to establish sessions 210*b*, 210*d*, 210*e*, 210*g* to access the web site facilitated by principles of the invention. In one embodiment, the server 215 (in some embodiments the server function may be fulfilled by more than one server) typically stores all or a substantial portion of the data associated with the operations associated with the system and methods of the invention in a database 216 relating to scheduled events for sports or other activities between entities. In certain aspects, the task of scheduling and communicating about scheduling may be simplified and streamlined by enabling schedulers 105*m*, 105*s*, 105*z*, administrators 115*a* and 115*e*, and Associations 125*b* and 125*c* to enter scheduling data, such as scheduled events, dates that an entity (e.g., college, university, team, association, school, organization, group, conference, etc.) is not available for an event, and/or dates that an entity is available for a scheduled event. The database 216 may contain records of scheduled events, available and unavailable dates, and data characterizing an entity, such as but not limited to person(s) designated as the scheduling contact(s) and region of the country.

Figure 3:
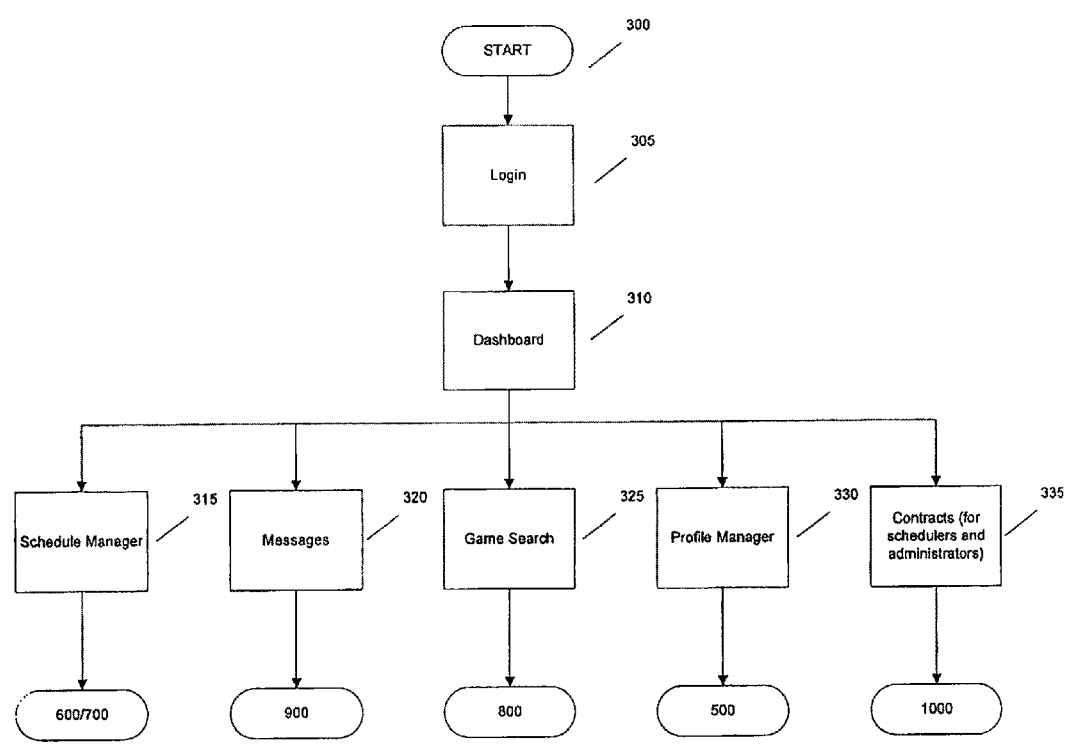
FIG. 3 is a functional block diagram of an embodiment of the dashboard which is an overview of the system functionality for the user, according to the principles of the invention.
Figure 11:
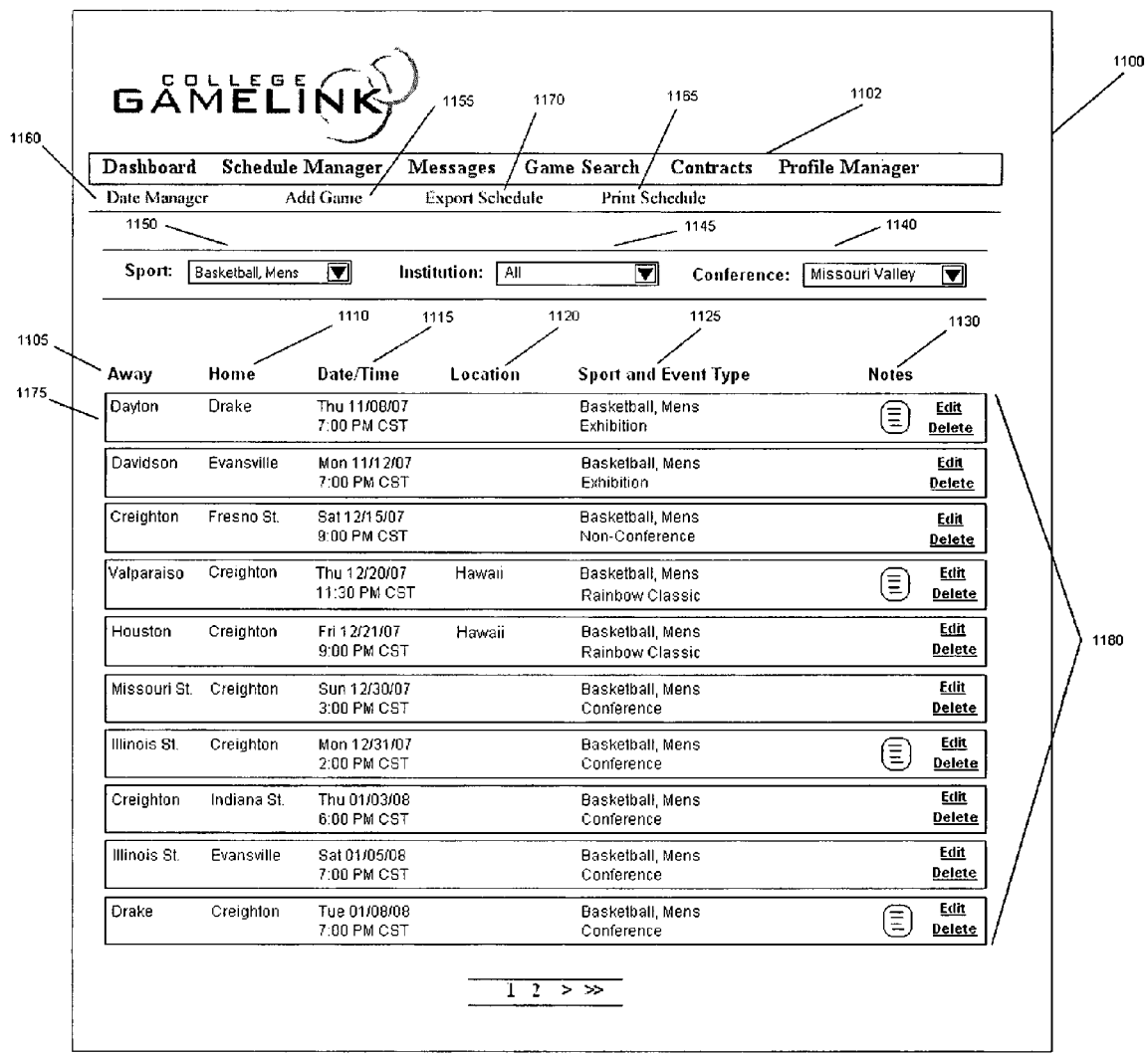
FIG. 11 is an embodiment of a graphical user interface (GUI) for the schedule manager, according to principles of the invention.

FIG. 3 is a functional block diagram of an embodiment an overview of the system functionality for a user, according to the principles of the invention. FIG. 3 may also represent a flow diagram of steps for using the components of the system functionality, starting at step 300. The dashboard 310 is typically a main screen presented to the user after a successful login 305 to the system. The dashboard displays the most recent activity for that institution, which may be the five most recent messages and the five most recent scheduled events (SE) added to the system, for example. The dashboard provides an overview of recent activity to keep the user informed of changes to SE. The dashboard 310 may include access to various functions including the Schedule Manager 315, Messages 320, Game Search 325, Profile Manager 330 and Contract Manager 335 and are generally accessible from the navigation toolbar located near the top of each graphical user interface GUI as shown in FIG. 11, 1102. Each function is discussed in more detail in the following flow diagrams.

Figure 4:
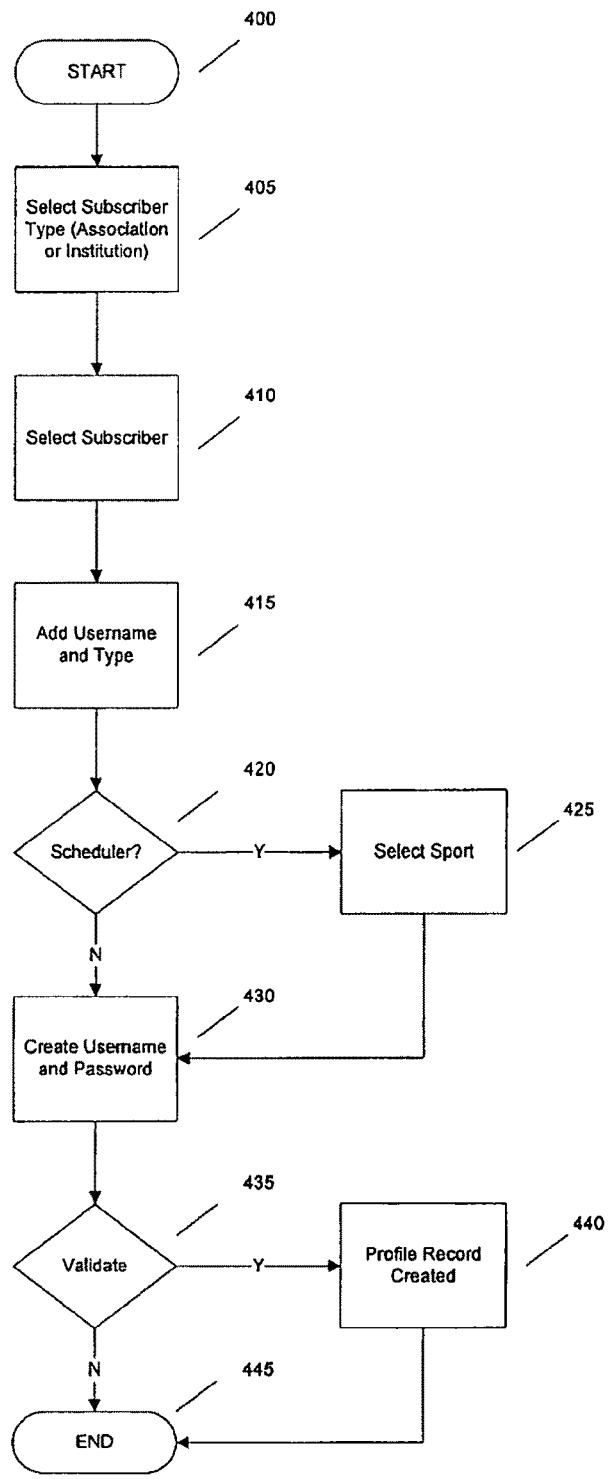
FIG. 4 is a flow diagram of embodiments showing steps of creating a system subscriber and user profiles, according to the principles of the invention.

FIG. 4 is a flow diagram of an embodiment showing steps of creating a system subscriber and user profiles, according to the principles of the invention, starting at 400. FIG. 4, and all other flow diagrams herein, may equally represent a high-level block diagram of components of the invention implementing the steps thereof. The steps of FIG. 4 (and other flow diagrams herein) may be implemented on computer program code in combination with the appropriate hardware having a processor(s) for execution of the computer program code. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network, perhaps embedded in a carrier wave to be extracted for execution. The steps of the flow diagrams herein may be implemented on the systems of FIGS. 1 and/or 2, for example.

At step 405, the system administrator (or other person) selects the subscriber type, such as Association or institution. At step 410, the system may present a list of organizations according to the subscriber type selected, and the system administrator may choose the desired one from the list. Then, at step 415 the system administrator adds one or more user name(s) and type of users. For example, types of users may include Association, athletic administrator at an institution and a scheduler such as a coach, and system administrator. If subscriber type is scheduler in step 420, then a sport is selected from the list presented in step 425 which associates the scheduler with the selected sport. At step 430, the system administrator may create a username and password. At step 435, the system validates the data. If valid, then at step 440, a user profile record is created. The user profile record may contain user information such as but not limited to name, address, phone number, e-mail address, subscriber type, Association, institution, and sport depending on the type of subscriber. This user information may be at least partially searchable. At step 445, the process ends.

Figure 5:
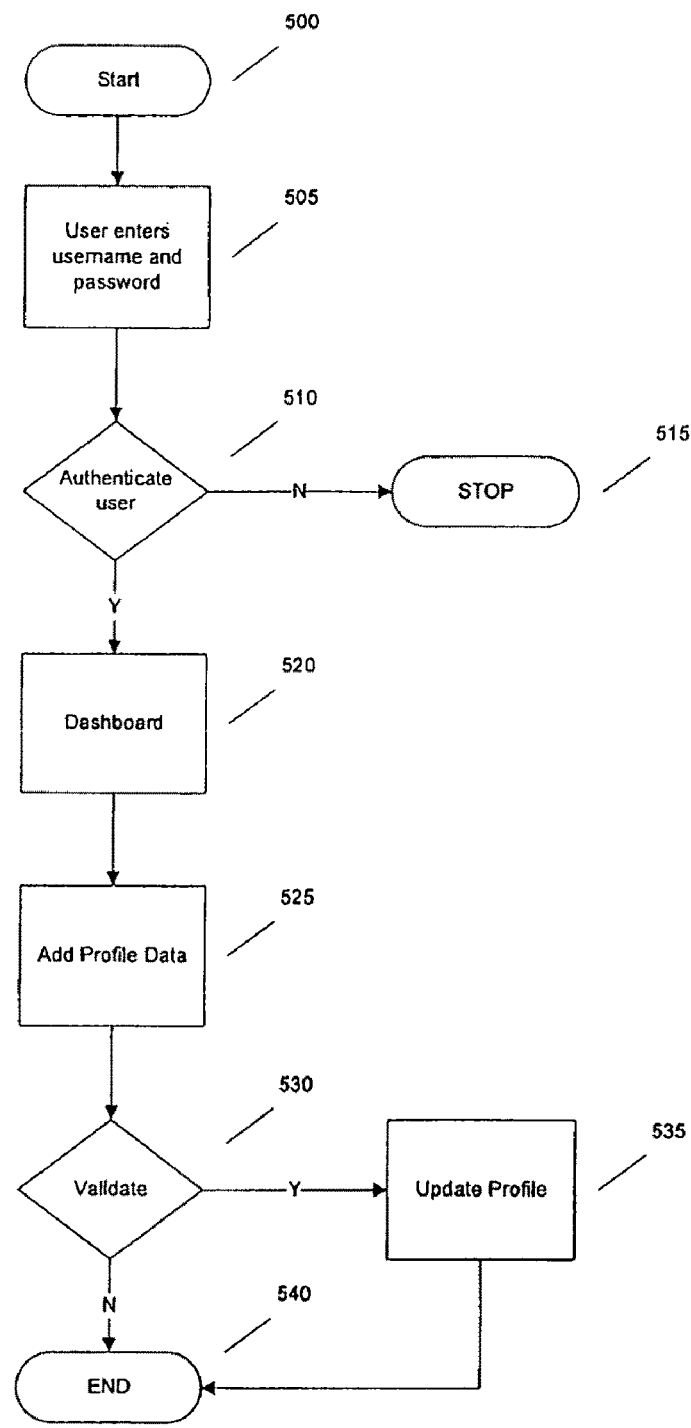
FIG. 5 is a flow diagram of an embodiment showing steps of maintaining scheduler, administrator, and/or Association profiles, according to principles of the invention.

FIG. 5 is a flow diagram of an embodiment showing steps of maintaining a scheduler, administrator and/or Association profiles, according to principles of the invention, beginning at step 500. At step 505, a scheduler, administrator or Association-type user logs into the system with the username and password, as assigned in FIG. 4 for example, by the system administrator. The system authenticates the user in step 510. If the username and password are not authenticated, the process ends at step 515. If the username and password are properly authenticated at step 510, then, at step 520 the user may be presented with the dashboard, which comprises an overview of the functions and most recent activity in the user's account. At step 525, schedulers and administrators add profile data to complete their contact information including, but not limited to, name, institution or organization, address, e-mail address, phone number, fax number, scheduling preferences, such as Series (for example, expressing interest in a single SE, or a multi-year SE, or no scheduling preference) and Guarantee (for example, expressing interest in willing to pay for a game shown as Yes, or not willing to pay a guarantee as No, or no preference), Polite Deny message text (a pre-composed brief sentence or set of sentences to express "no interest" in scheduling an event, which is used in a reply function further described in relation to FIG. 9), and/or time zone. Administrator user types may select the primary and secondary game search recipients from a list of users at their institution that are designated to receive game search messages (further described in relation to FIG. 8B, step 870). At step 530, the data is validated and the profile record is updated at step 535. The process ends at step 540.

Figure 6A:
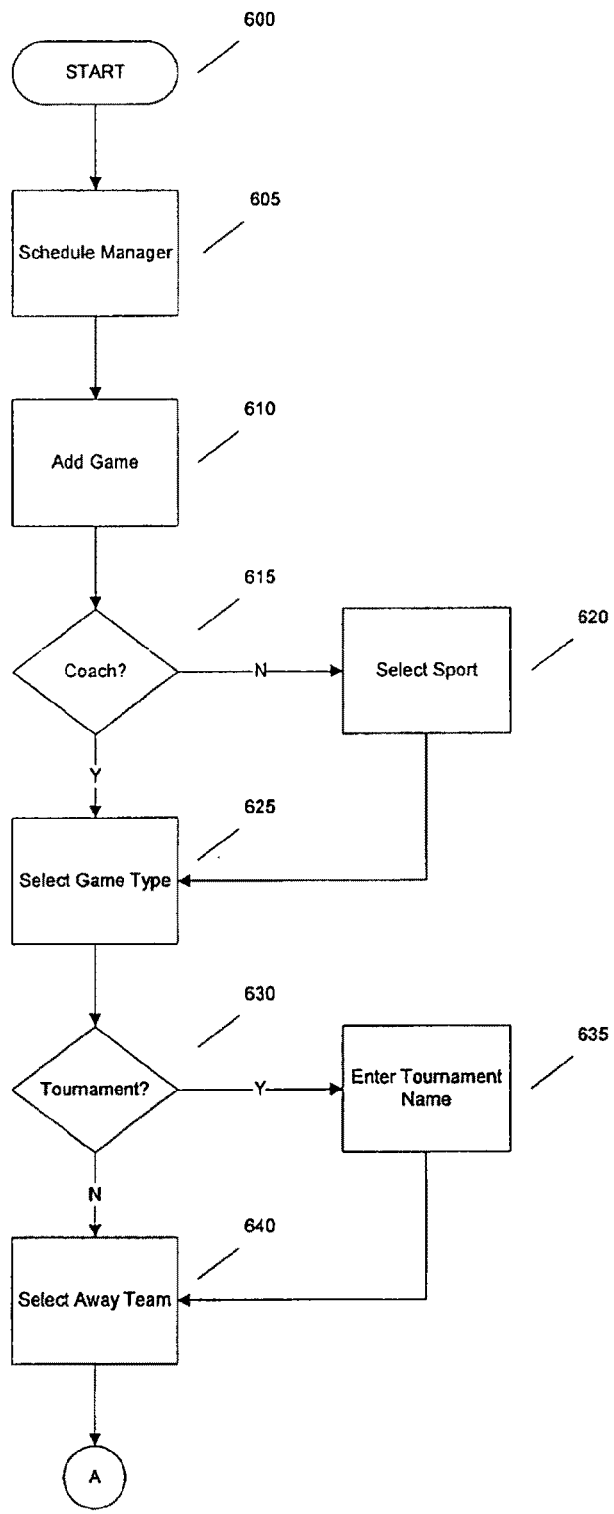
FIGS. 6A and 6B are flow diagrams of an embodiment showing steps of adding a scheduled game and updating the schedule manager according to principles of the invention.
Figure 6B:
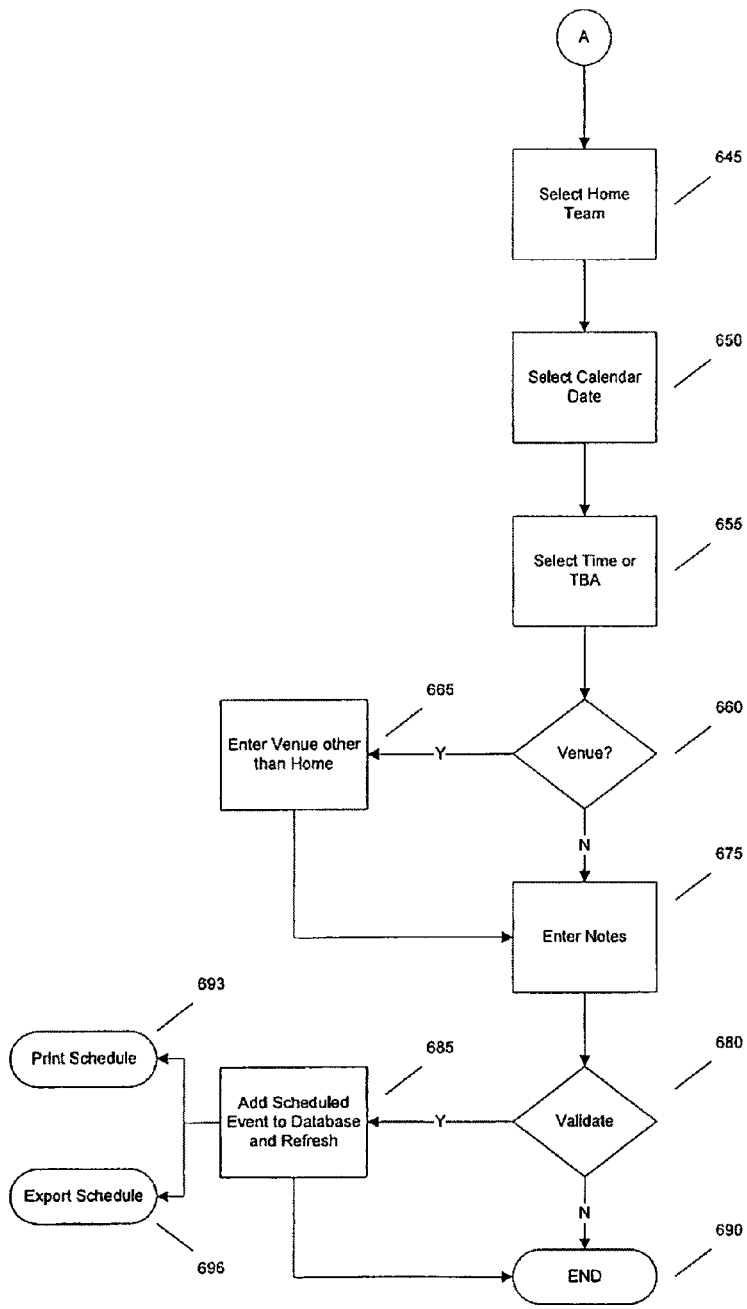

FIGS. 6A and 6B are flow diagrams of an embodiment showing steps of adding a scheduled game and updating the schedule manager according to principles of the invention, beginning at step 600. FIGS. 6A and 6B may be considered in view of FIG. 11 which illustrates an embodiment of a graphical user interface (GUI) of the Schedule Manager 1100, according to principles of the invention.

At step 605 in FIG. 6A, a Schedule Manager is activated which is a software implemented program component to view scheduled events (SE). SE may include game competitions, meetings, or other planned events between two or more institutions, entities, or organizations, referenced herein as institutions. An SE may be referred to herein as a single scheduled event between two entities as shown in relation to FIG. 11, 1175, or as aggregated SE data referred to as a composite schedule for an Association is shown in relation to FIG. 11, 1180.

The SE data in FIG. 11 is displayed representing two (or more) institutions involved in the SE according to "Away" 1105 and "Home" 1110, "date and time" 1115, "location" 1120 if other than home venue, "Sport and Event Type" 1125, and "Notes" 1130 associated with the SE. Schedule Manager 1100 displays SE according to permissions to view and update data associated with the user role such as, but not limited to user types of scheduler, administrator, Association, or system administrator.

FIG. 11, 1140 shows a drop down menu for selecting an Association (in this example, the Missouri Valley conference), perhaps to view SE data for all of its member institutions in a composite schedule. An Association may select one of its institutions (or "All" institutions as shown in the example) to view via drop down menu selection field 1145. An Association may view all of its sports or activities, or it may select one of its sports or activities to view in drop down menu field 1150 (in this example, "Basketball, Mens" is selected). The system administrator may view all SE with the ability to select, for example, by Association, by Institution, by sport, and other parameters as designated, perhaps by division level, for example. The aggregation of all SE data results in the composite schedule 1180, which is an example of one type of output provided by the system and methods of the invention.

Other types of users, for example, the media which might include television networks or other organizations may subscribe to the system for a fee to view aggregated SE data, such as the composite schedule, typically at such date that the SE data is considered "non-confidential" information. The date that SE data for a particular sport is considered "non-confidential" may be stored in the Association's profile record. Views may be determined by roles of the users with permissions set to view composite schedules, for example by division, by conference, by institution, or by date.

Figure 12:
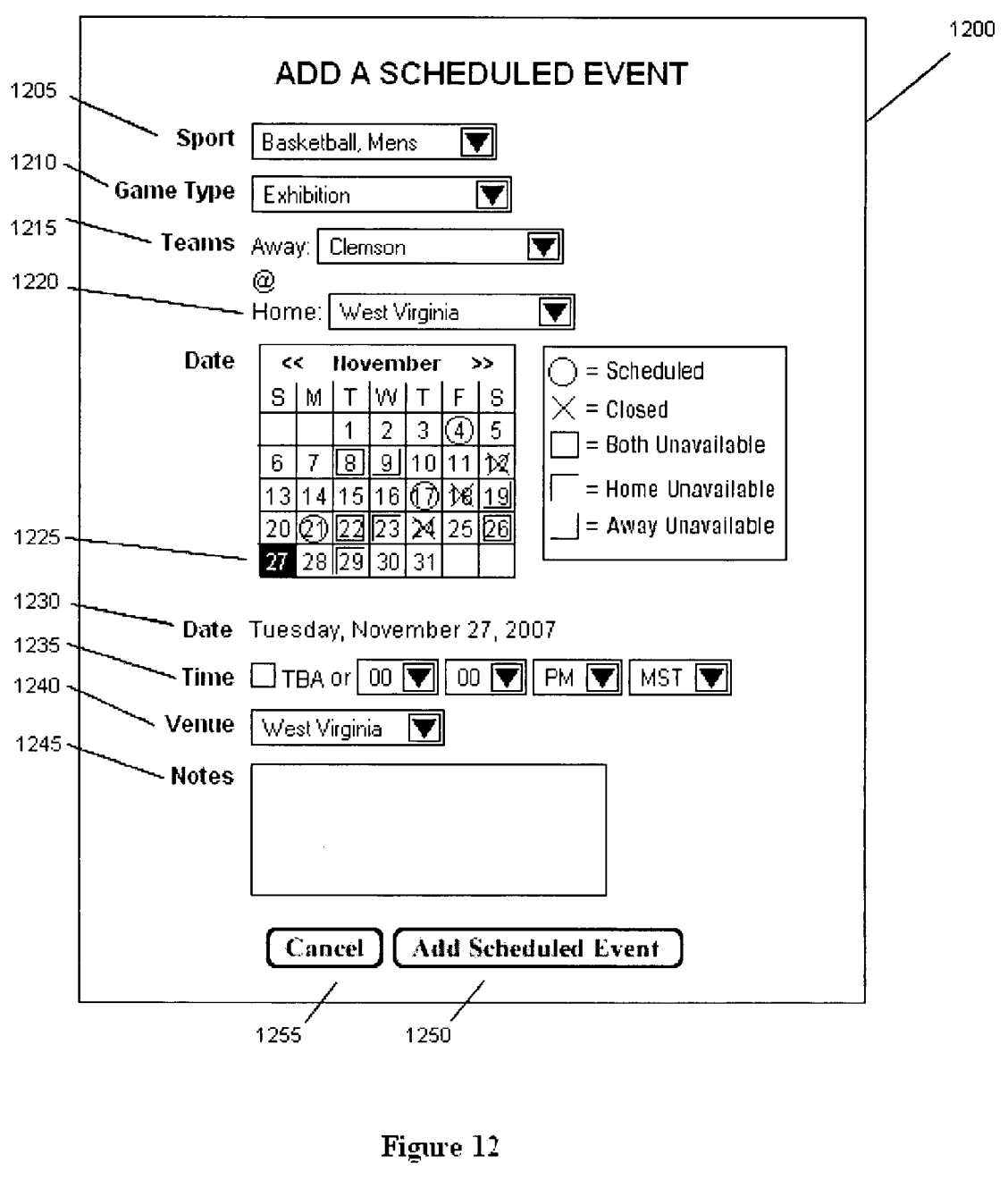

FIG. 12 is an embodiment of a graphical user interfaces (GUI) for adding a game or event to the schedule manager, according to principles of the invention, generally denoted by reference numeral 1200. In FIG. 6A, at step 610, adding a scheduled event SE is initiated by selecting Add Game 1155 (i.e., on the Schedule Manager 1100). This step 610 includes presenting the user with the screen and data fields as shown in FIG. 12, which illustrates an embodiment of a GUI for facilitating various steps of FIG. 6A.

At step 615, a check is made to determine if the scheduler type is a coach associated with only one sport, or is an institutional administrator or Association in charge of multiple sports (alternatively this step may ask for which "event", if other than sports). If the user type is not a coach associated with one sport, then at step 620, the system requires the administrator or Association to choose a sport or event (see, FIG. 12, 1205). At step 625, the scheduler may input data into the system by selecting the type of event from a list presented (perhaps via a drop down list, e.g., FIG. 12, 1210). At step 630, a check is made whether a tournament has been selected. If so, then at step 635, the scheduler may be prompted to input a tournament name. In step 640, the scheduler may select an entity from the presented list of institution names for the away team (FIG. 12, 1215). At step 645, a home team may be selected from the presented list of institutions as shown in FIG. 6B (FIG. 12, 1220). In steps 640 and 645, if the user that is adding an SE is an Association, then the selection of institutions to choose from may be limited to those affiliated with that particular Association. However, if tournament type is selected in step 630, by any type of user, then all institutions are typically available in the selection list.

At step 650, the appropriate event date(s) may be selected from a calendar (FIG. 12, 1225) and may be displayed for visual confirmation (FIG. 12, 1230). The SE time, or alternatively, an indication of "To be announced at a later date" denoted as TBA, may be selected at step 655 (FIG. 12, 1235). At step 660 a user may make the decision to indicate a venue other than the default location of the home team (FIG. 12, 1240). If the user selects "Other" for venue, then at step 665, the user would prompted to enter another venue name for the location of the SE. At step 675, explanatory notes may be entered as desired to be recorded about the SE (FIG. 12, 1245).

At step 680, a decision is made whether to accept or validate the information entered and add the SE to a database of scheduled events (FIG. 12, 1250) or cancel the transaction (FIG. 12, 1255). Canceling in step 680 would take the user to step 690 where the process ends. In step 680, the data entered is validated. At step 685, the SE is added to the schedule database for both the home team and the away teams. In this manner, both institutions (perhaps more) involved in the SE (i.e., away and home institutions at steps 640 and 645 respectively) are updated to remain in synch (i.e., the schedules are maintained to be currently synchronized, typically in near real-time), and to update to the new current status to prevent double booking, for example. This balanced entry for both institutions SE eliminates the out of balance conditions and the need to reconcile the SE data manually at the Association level to find conflicting information for time and date. The composite view of the aggregate data should be a positive strength and a unique feature for users by maintaining the SE for both entities. The Schedule Manager is also refreshed. The process ends at step 690.

Optional step 693 shows that the SE data may be printed (FIG. 11, 1165). Optional step 696 shows that the composite schedule shown in the Schedule Manager may be exported (FIG. 11, 1170) into a an electronic file format, such as a spreadsheet or comma delimited file that may be downloaded into third party product(s), perhaps for a fee.

Figure 7:
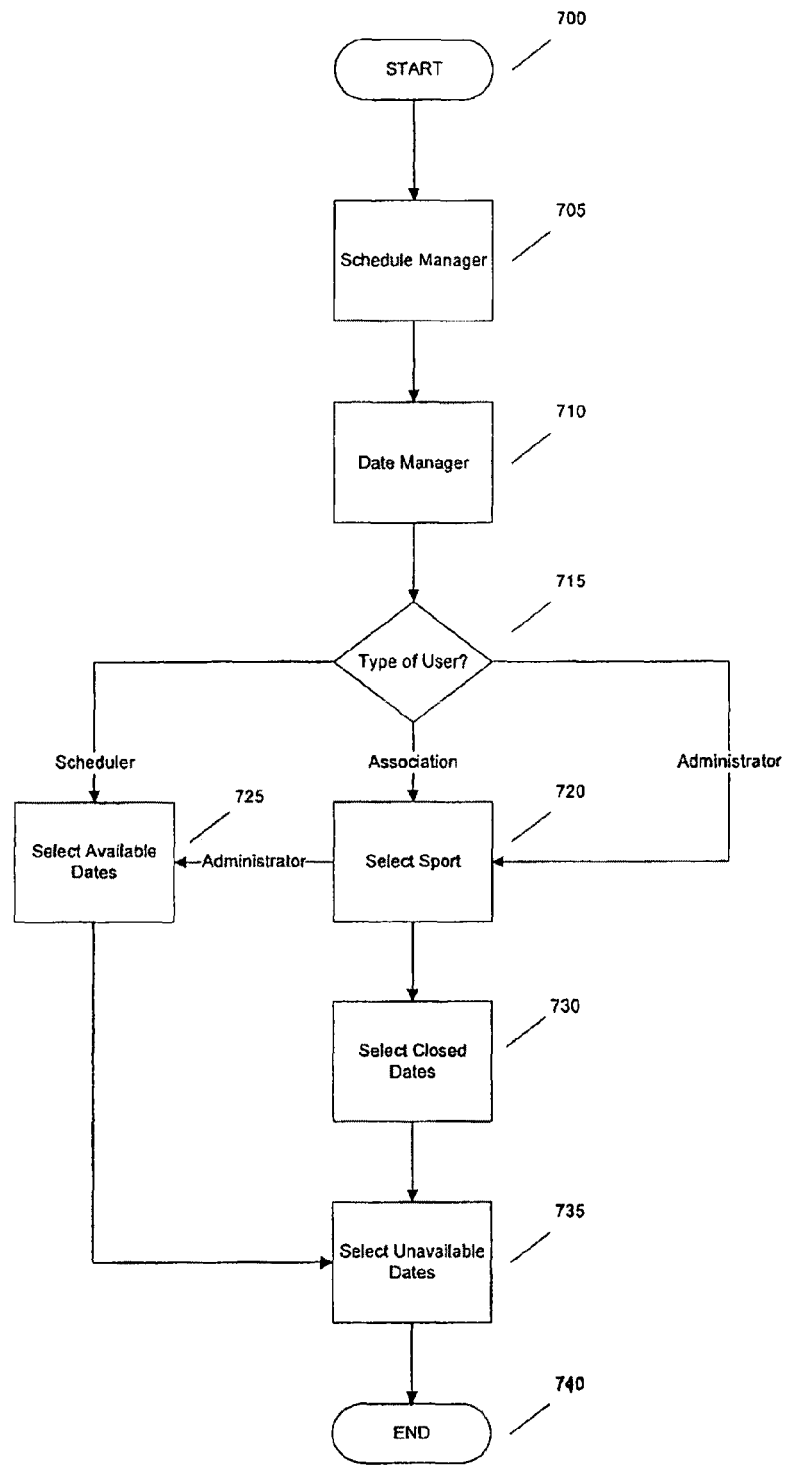
FIG. 7 is a flow diagram of an embodiment showing steps for indicating availability on calendar dates, according to principles of the invention.
Figure 13A:
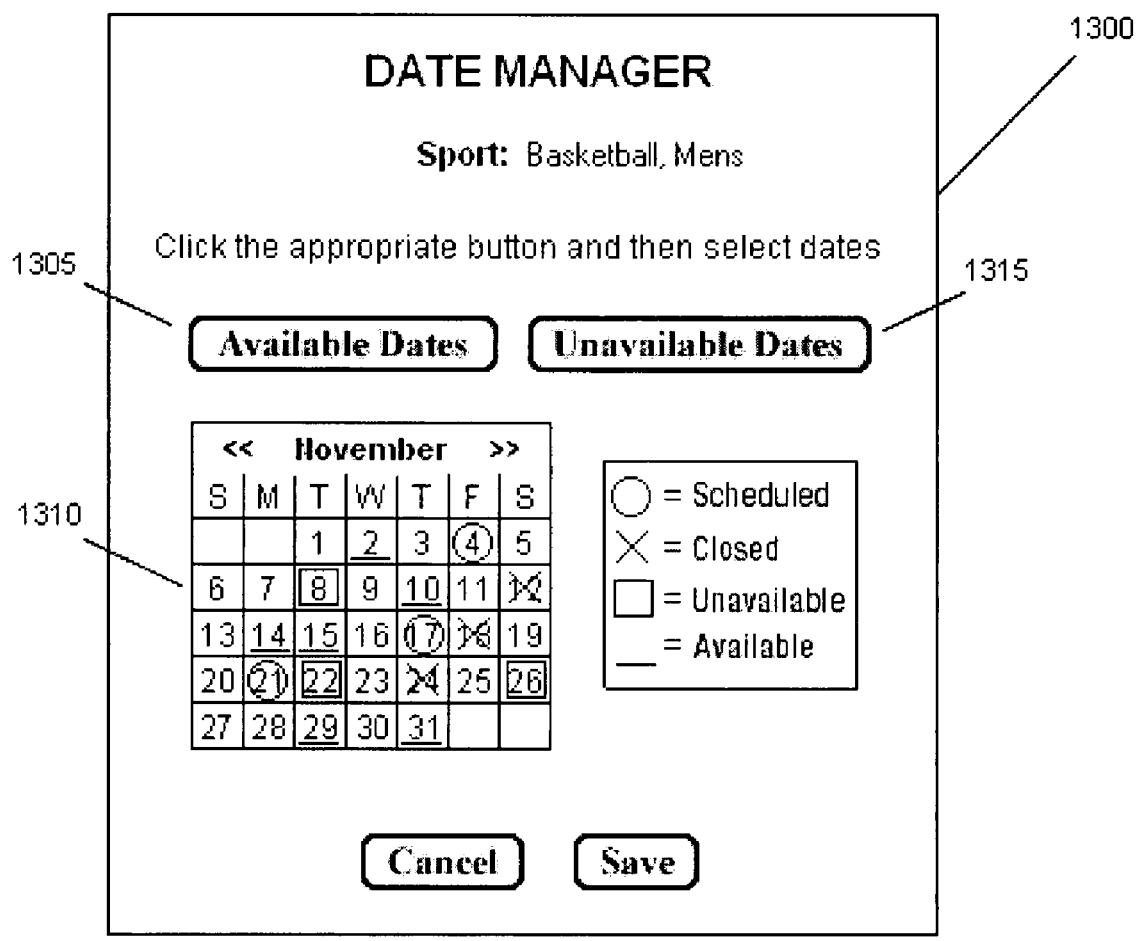
FIGS. 13A and 13B are embodiments of a graphical user interface (GUI) for indicating availability on calendar dates for two types of system users, a scheduler and an Association, respectively, according to principles of the invention.

FIG. 7 is a flow diagram of an embodiment showing steps for indicating availability on calendar dates, according to principles of the invention, starting at step 700. The Schedule Manager may be selected by the scheduler in step 705. At step 710, Date Manager (FIG. 11, 1160) may be selected and the scheduler is presented with an interactive date management screen, such as shown in FIG. 13A, generally denoted by 1300. The date management screen 1300 is an exemplary illustration of a GUI for facilitating many of the steps in FIG. 7, such as for a scheduler user.

At step 715, a check is made whether the user is a scheduler. If so, then at step 725, the user may select the Available Dates button (FIG. 13A, 1305), and then may click in the calendar on the date (FIG. 13A, 1310) for available or preferable dates for scheduled events (SE), which may include indication of home, away, or no preference. The system responds by showing the calendar date in the respective color or symbol defined by the legend. A third color or symbol may be used to indicate dates of previously scheduled events. In this way, a color scheme aids in representing different statuses to the user visually.

Figure 13B:
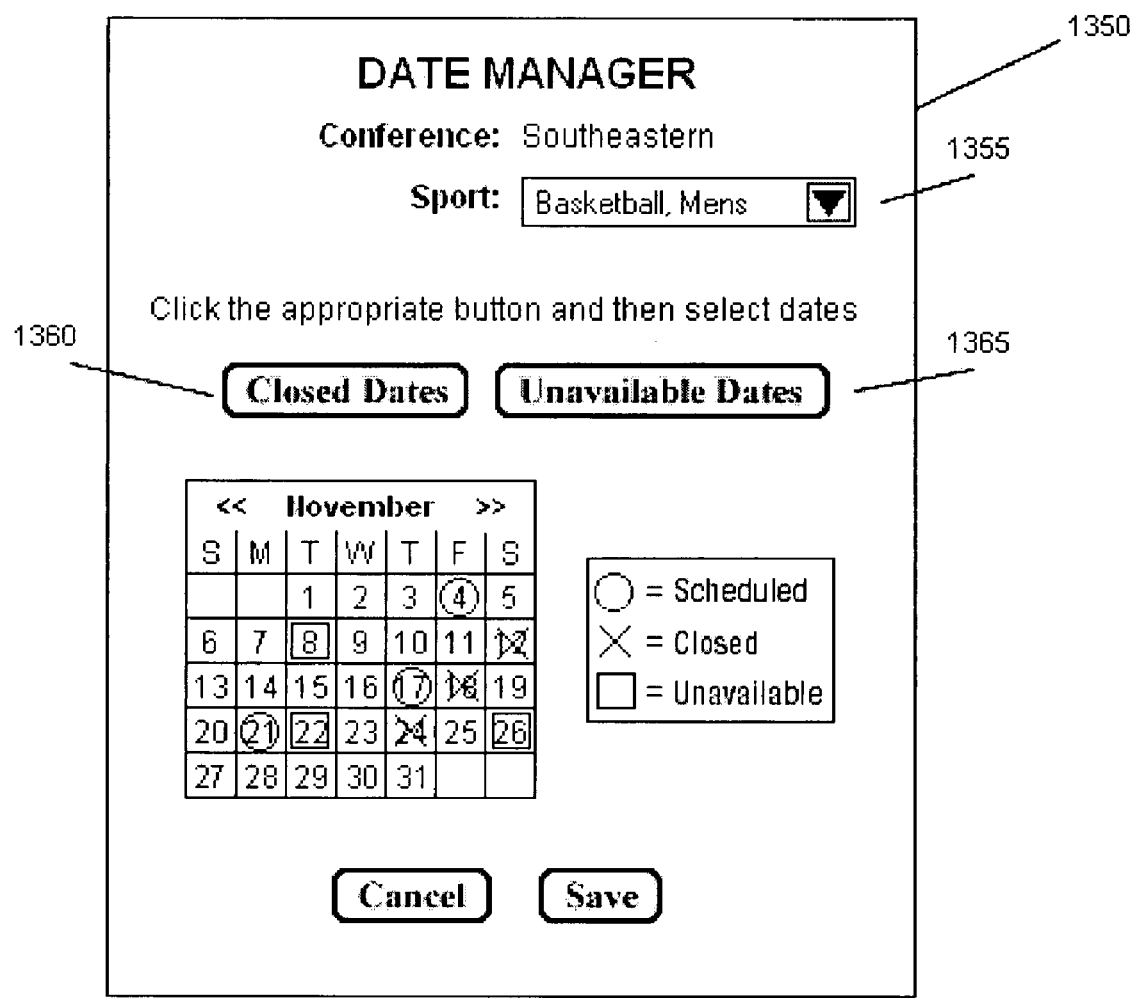

In step 715, if the user is not a scheduler, then the system prompts the user to select a sport in step 720 (FIG. 13B, 1355). If the user is an administrator, then the flow continues to step 725, where dates available or preferable for desired SE may be selected by selecting or clicking on a calendar date.

In step 715, if the user is an Association, then the user is allowed to mark dates at step 730 that are closed or reserved for potential intra-Association SE (FIG. 13B, 1360). An Association would be presented with the screen shown in the GUI FIG. 13B, generally denoted by 1350. Dates indicated as closed are not able to be selected for scheduling events for any users until the closed condition is removed by the Association. Closed dates are indicated by the color black or the symbol "X" as shown in GUI FIGS. 13A and B, or some other indicator referenced in a legend of its type.

Schedulers, administrators, and Associations may mark dates that are unavailable for scheduling competitions at step 735 for a variety of reasons such as but not limited to holiday, exams, and day of rest needed before or after an existing SE, (FIG. 13A, 1315 and FIG. 13B, 1365). In step 735, the Unavailable Dates button is selected for the scheduler to then select calendar dates that the entity is not available for a scheduled event. The process ends at step 740.

Figure 8A:
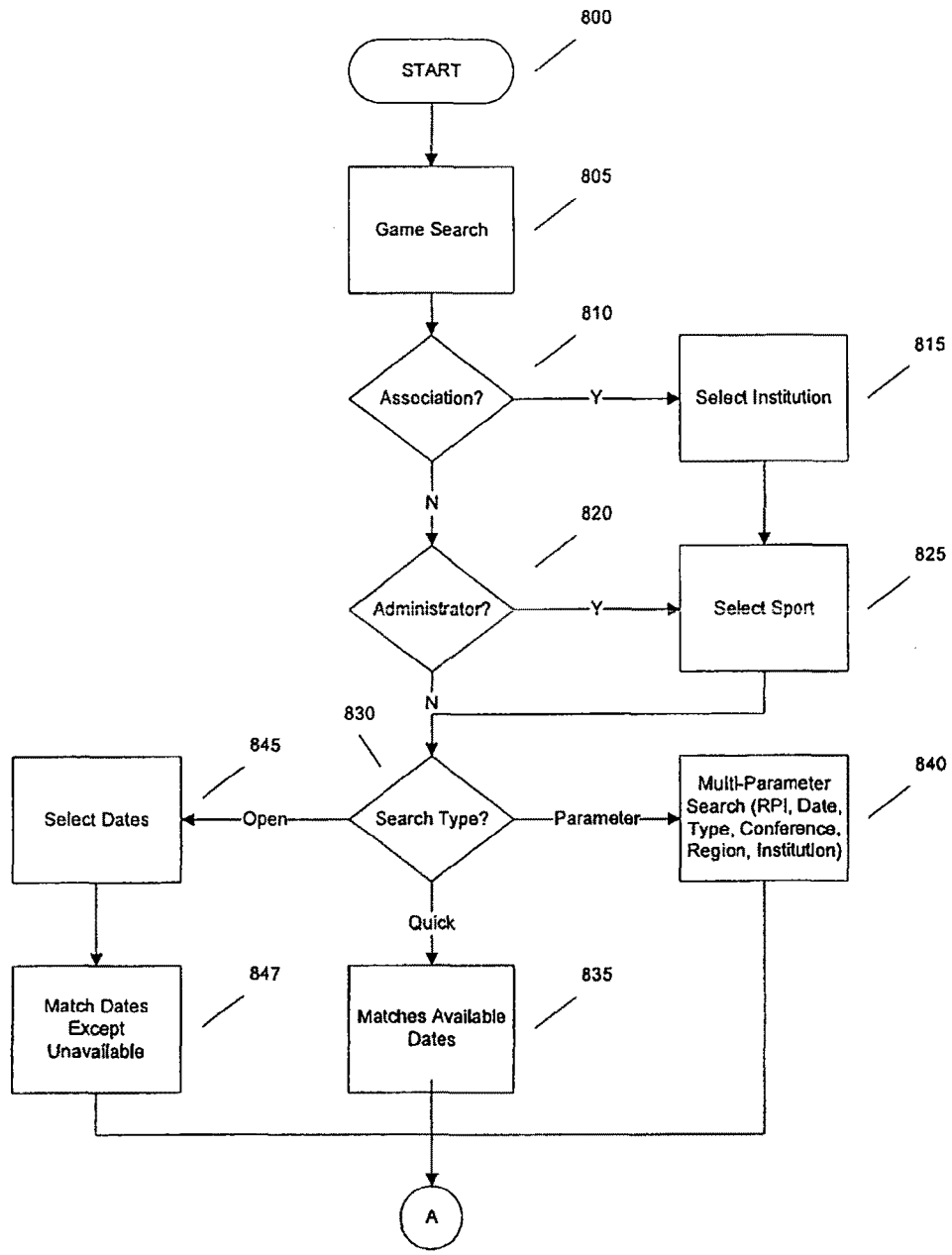
FIGS. 8A and 8B are flow diagrams of an embodiment showing steps for searching for opponents and search results based on matching search parameters specified, according to principles of the invention.
Figure 8B:
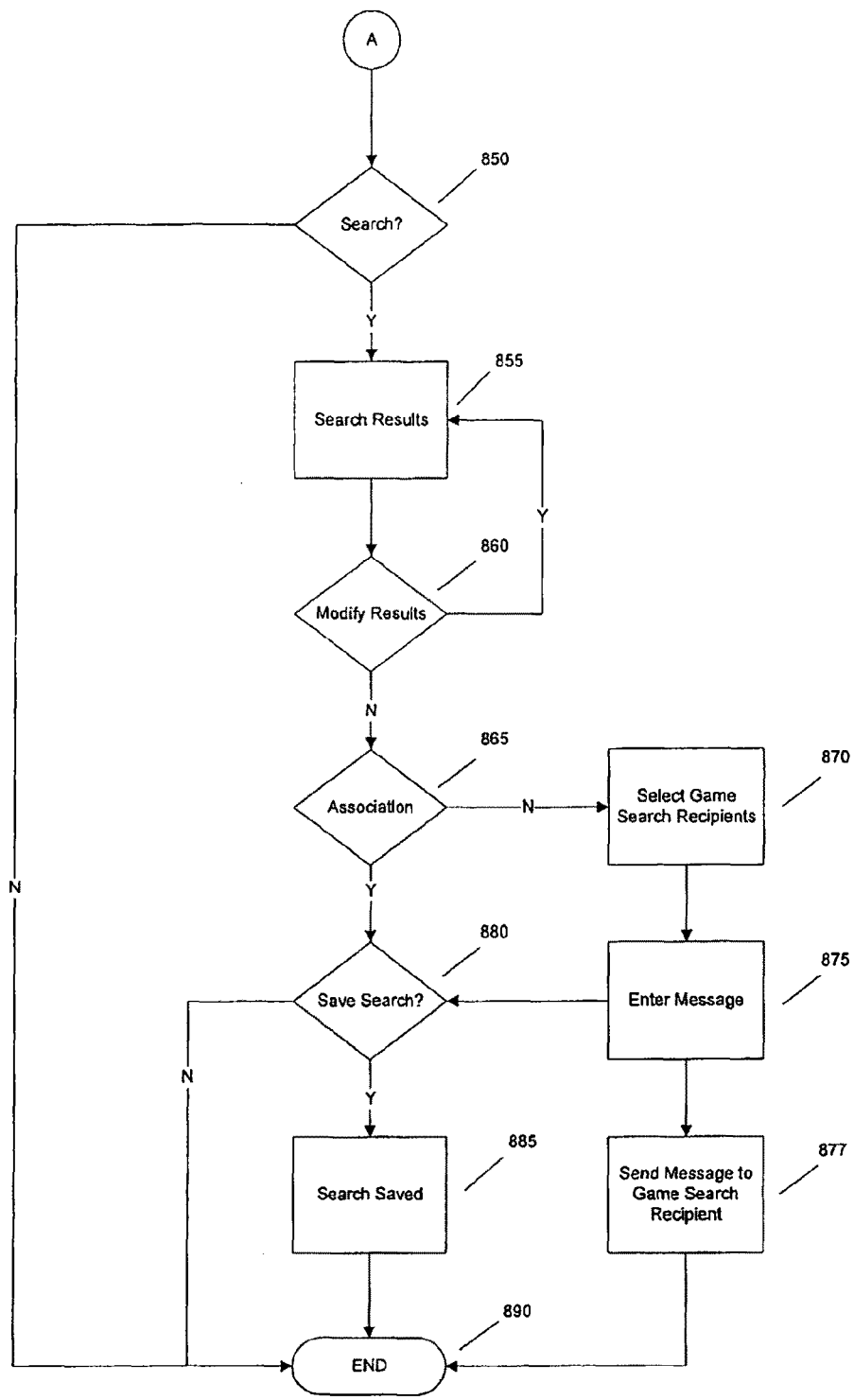

FIGS. 8A and 8B are flow diagrams of an embodiment showing steps for searching opponents based on matching search parameters specified, according to principles of the invention, starting at step 800. FIGS. 8A and 8B may also be viewed in relation to FIG. 14, which illustrates an embodiment of a GUI, generally denoted as 1400, for facilitating certain steps of scheduling, according to principles of the invention.

Figure 14:
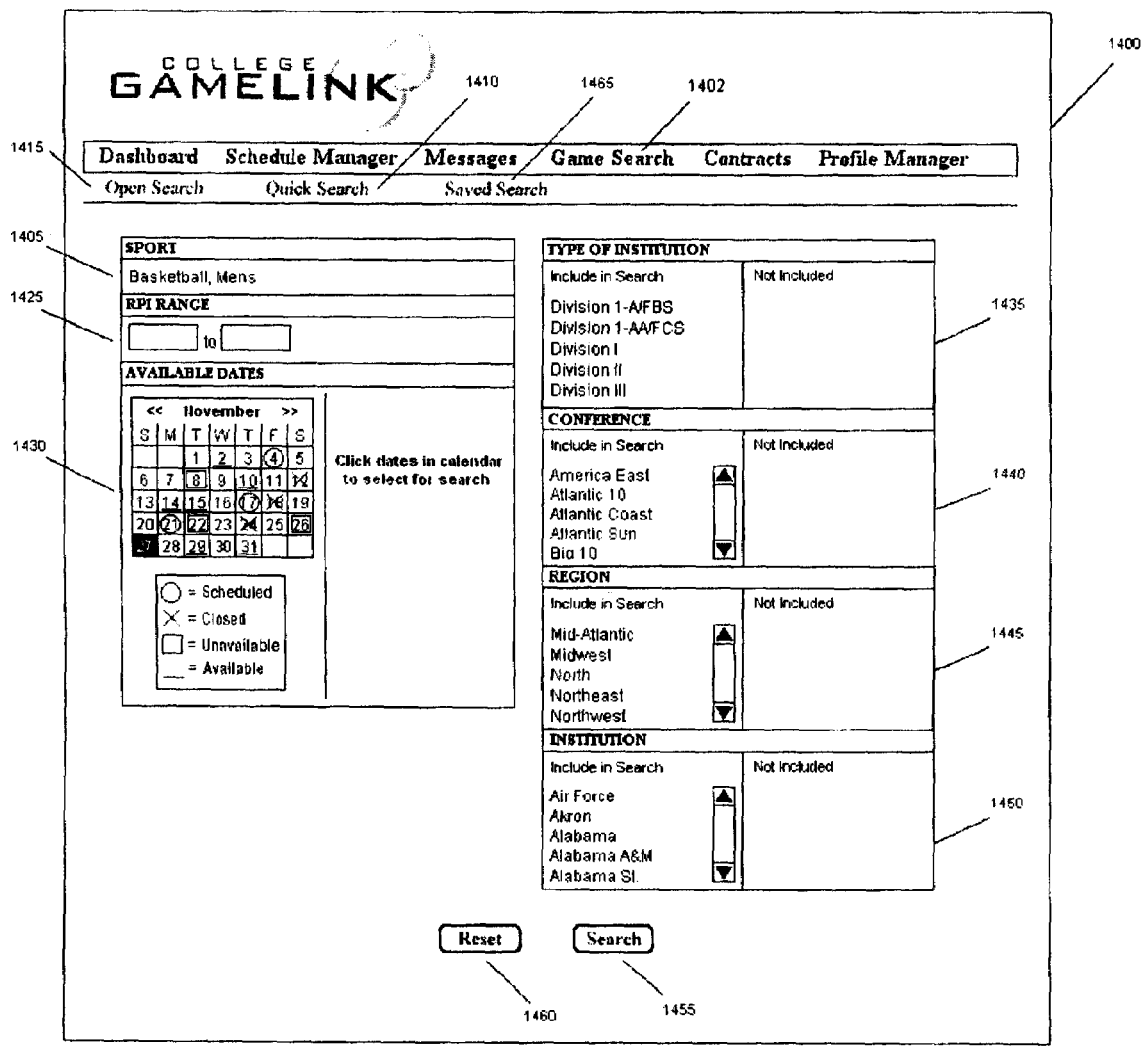
FIG. 14 is an embodiment of a graphical user interface (GUI) for searching for opponents by parameters, according to principles of the invention.

At step 805, Game Search may be selected from the toolbar FIG. 14, 1402. At step 810, a check is made whether the user is an Association. If so, then the user may be prompted at step 815 to select one of its member institutions from a list (perhaps a drop down list). Then at step 825, the Association may be prompted to select a sport. But, for a scheduler type user where the sport is already defined in the user's profile (e.g., step 425 in FIG. 4), the sport is pre-set in display text and is typically not selectable for a scheduler (e.g., as shown in FIG. 14, 1405).

However, if at step 810, if the user (i.e., searcher's identity) is not an Association, then at step 820 the system checks to see if the user is an administrator. If the user is an administrator, then at step 825, the system prompts the user to select a sport. However, if the user is not an administrator, then at step 830, the user may select the type of search they wish to perform.

A scheduler, administrator, or Association may choose from several search options depending on scheduling needs: such as, but not limited to Quick Search (FIG. 14, 1410), Open Search (FIG. 14, 1415) or a parameter search, which is the default search type that allows the user to tailor the search based on parameters shown in FIG. 14, 1425-1450. A user may tailor the search by indicating delimiters such as a power rating range, which is a ranking of strength compared to others in its division. These rankings are available from an external data source generally known to those in the sports world. Some examples of ranking scores include but are not limited to collegiate basketball ratings or football ratings that consider the strength of schedule from previous seasons as well as the win-loss record that determine through weighted algorithms the team's ranking compared to the other teams in the division. It may be beneficial to users to access this disparate data source and match it with institutions and sports programs in the logically centralized database maintained according to principles of the invention for users to be able to search by this type of ranking.

At step 830, a check is made of what type of search has been selected. If, Quick Search is selected, then at step 835 in FIG. 8A (FIG. 14, 1410) returns results based on matching all available dates with opponents who have availability on the same dates as the user making the search request. This is a quick action feature that requires no effort on the part of the user other than maintaining SE in Schedule Manager and maintaining available and unavailable dates in Date Manager.

At step 840 in FIG. 8A, the default search by parameters typically matches criteria selected by the scheduler such as a range of power ratings, for example RPI for basketball, or some other type of ranking. Other parameters to limit the search may be indicated such as specific dates selected by the user by clicking on the calendar dates, shown in FIG. 14 as 1430. Further specification of search criteria may be selected, such as type of institution (FIG. 14, 1435), Association or conferences (FIG. 14, 1440), region of the country or world (FIG. 14, 1445), or specific institution (FIG. 14, 1450), or combinations thereof.

If Open search is selected, at step 845 any dates may be selected to search in FIG. 14, 1430 and parameters may be entered to tailor the search. This type of search matches all dates except those marked unavailable by the institutions.

These three types of searches are examples of searches based on matching dates and criteria specified by the user performing the search or defaults to those dates already selected as Available dates. Other type of searches may be performed such as based on geographic parameters, age brackets, team or participant skill level; rankings based on national rankings, and/or league rankings. Even event facilities (e.g., availability, fan capacity or lighting capabilities) may be a search parameter, as well as projected monetary returns for participating in a particular event, travel convenience (e.g., nearby airport), or types of lodging. Essentially, nearly any type of criteria in any combination may be established as a search parameter or criteria to facilitate scheduling.

To initiate the search, the user may select the search button (FIG. 14, 1455). At step 850 (FIG. 14, 1455) a check is made if the search has been initiated. If so, the system matches criteria specified and/or based on the scheduler's specified criteria and dates, if provided. If a search is not initiated, then the process ends at step 890.

Figure 15:
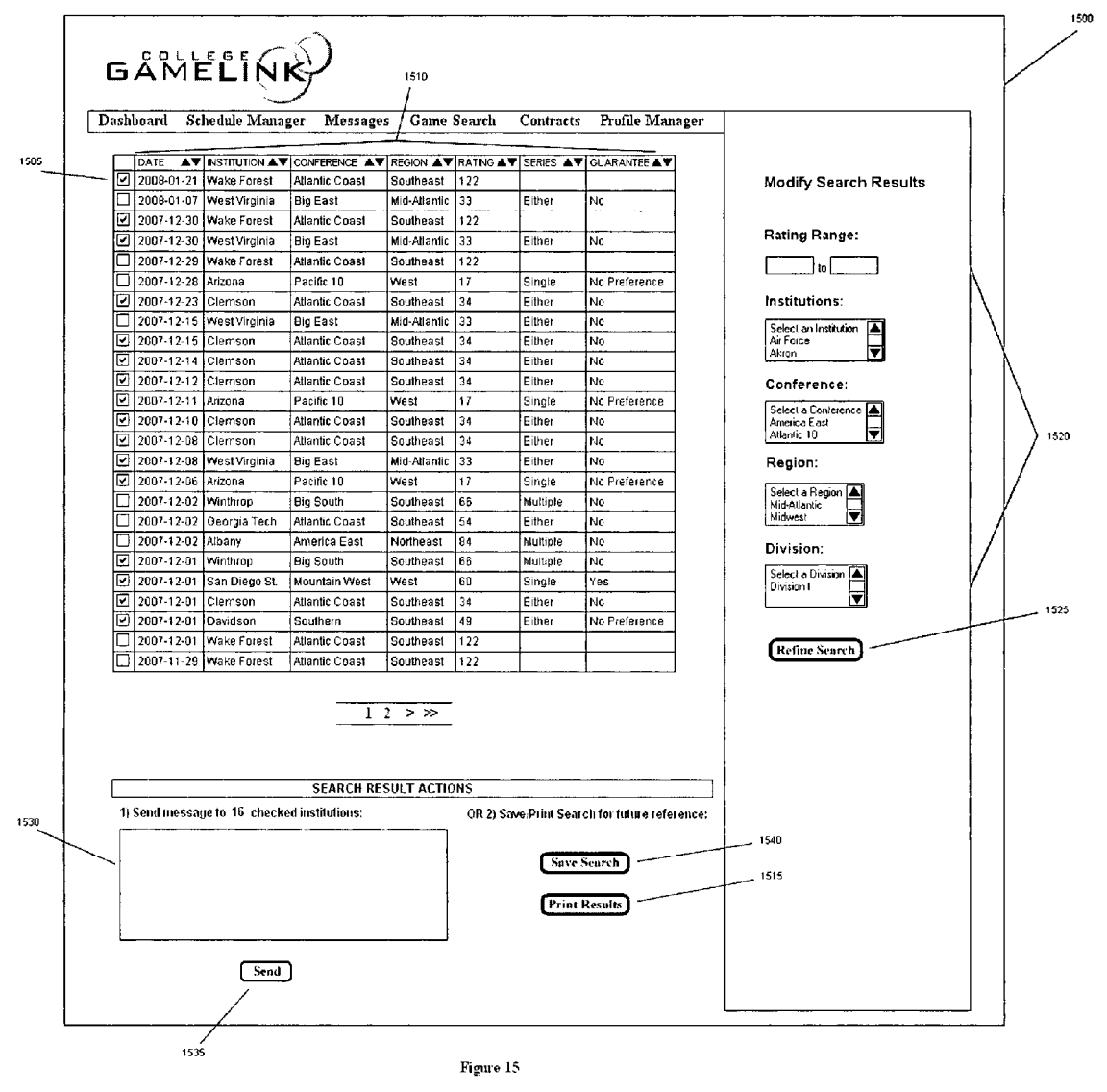

Otherwise, if a search is initiated, then at step 855, the search results may be displayed shown in the exemplary output of FIG. 15, generally denoted as 1500. Typically, all institutions matching the search criteria are displayed in search results (FIG. 15, 1505). Search results can be sorted by double-clicking on any column heading, i.e., any of the exemplary column headings designated generally in FIG. 15, as 1510, and include Date, Institution, Conference (i.e., Association), Region, Rating, Series, and Guarantee). Search results are printable (FIG. 15, 1515).

Search results may be further refined or modified by parameters selectable and shown in (FIG. 15, 1520) to narrow the original search results down by using the same parameters used in the original search such as Rating, Institution, Conference (i.e., Association), Region, and/or Division. The user may choose to modify the search results in step 860. A search may be modified by changing search criteria (FIG. 15, 1520) and re-submitting the search (FIG. 15, 1525). The system returns new search results based on the refined search. An example of refining the search results would include when the original search using no specified region of the country resulted in 250 search results, for example. Then, refining the original search results by selecting one or more regions would narrow the results to a sub-set of the original results, thus making the search results align with the user's need for information. Multiple parameters may be used to refine search results and multiple selections within parameters may be selected.

If the user is not an Association, the scheduler or administrator may select specific recipients for specific dates at step 870 to correspond with to ascertain the opponents' interest in a scheduled event for that date, or the scheduler or administrator may select all institutions (FIG. 15, 1505). The scheduler may enter a message at step 875 (FIG. 15, 1530) to be sent to the institutions selected at step 870. The scheduler typically clicks the send button to send the message (FIG. 15, 1535). In step 877, the messages is then sent to the designated game search recipients as defined by that institution's profile data previously described in FIG. 5 at step 525. In some embodiments, the message might include a deadline by which a reply must be received in return; otherwise it is no longer a valid message or request. The process ends at step 890.

The user may select the Save Search button at step 880 (FIG. 15, 1540) that usually prompts the scheduler to enter a name for the search. The system saves the search parameters so that it may be run again at a later time by accessing saved searches from the Game Search GUI in FIG. 14, 1465.

Figure 9:
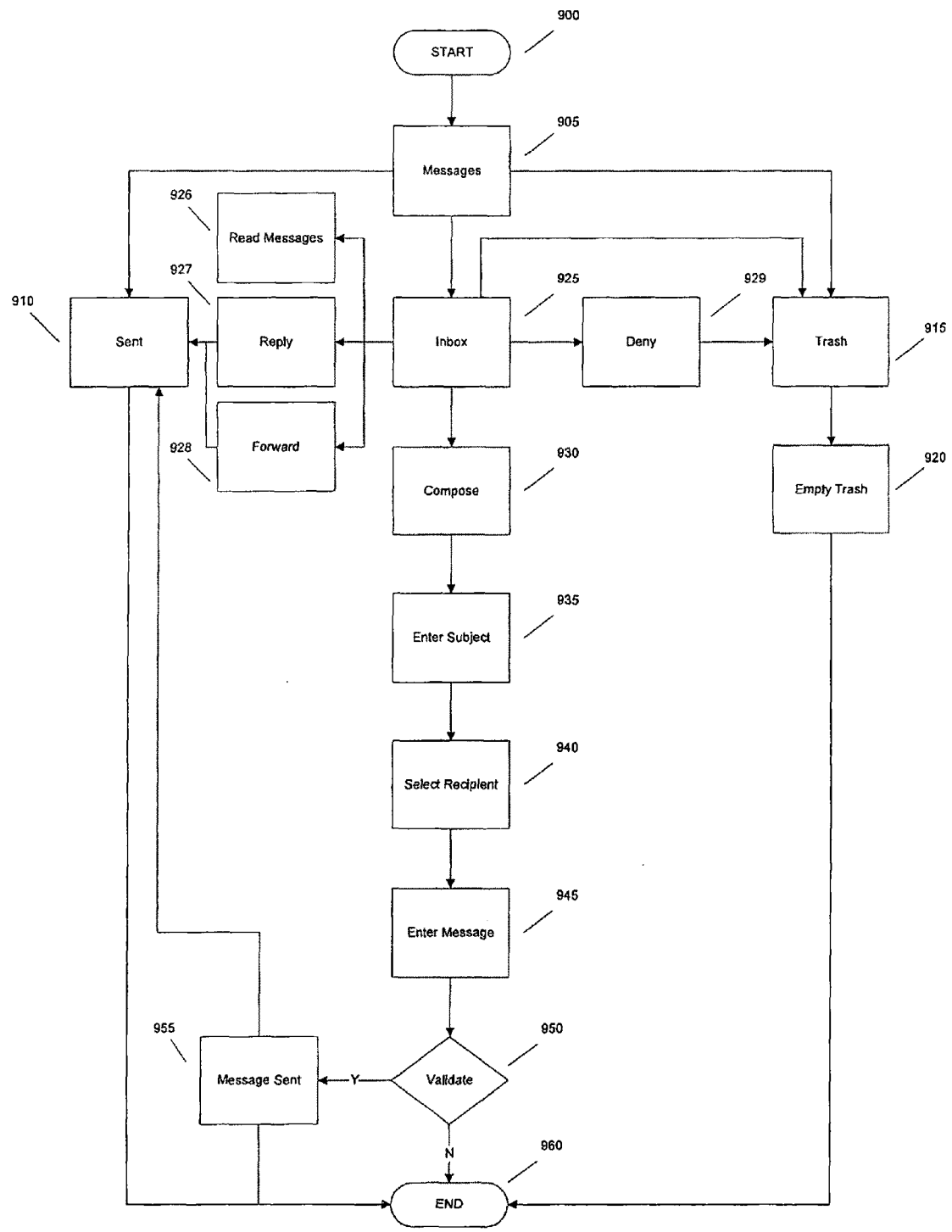
FIG. 9 is a flow diagram showing steps for communicating with potential opponents in the search results and receiving and replying to messages, according to principles of the invention.
Figure 16:
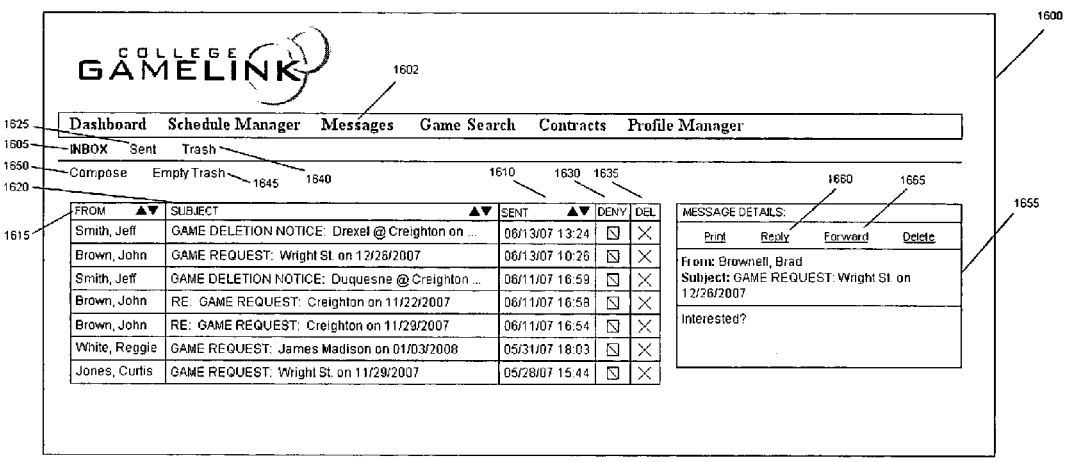
FIG. 16 is an embodiment of a graphical user interface (GUI) for messages, according to principles of the invention.

FIG. 9 is a flow diagram showing an embodiment of steps for communicating internally on the system network between schedulers, administrators and Associations regarding potential opponents for scheduled events, according to principles of the invention, starting at step 900. FIG. 16 is an embodiment of a graphical user interfaces (GUI) for messages such as those resulting from game searches and SE changes and deletions, generally denoted by reference numeral 1600, and may be viewed in conjunction with FIG. 9.

A Message Center operation provides for direct communication between schedulers, administrators, or Associations regarding future or existing SE, such as notice of time or date changes of a SE. The Message Center is accessible in step 905 (FIG. 1600, 1602). The Message Center component may also be accessible through a portable web-accessible device, such as a PDA or web-enabled cellular device, for example. Messages are viewable in an in-box 925 (FIG. 16, 1605) and are sortable by date (FIG. 16, 1610) sender (FIG. 16, 1615), or subject (FIG. 16, 1620). Messages may be viewed by those sent out by the user at step 910 (FIG. 16, 1625). Messages may be responded to quickly and easily by a feature called a Polite Deny as shown by the Deny button (FIG. 16, 1630). This feature permits a user reading their inbox messages to press the Deny button and promptly notifies the sender that they are not interested in a scheduled event (SE) on that date (i.e., using a pre-composed message that is maintained for this purpose). This quick response, in turn, allows the sender to promptly know that the recipient is not interested in a SE and allows them to move on to find other viable opponents to schedule who may be interested. This feature takes the delay out of communicating due to unresponsiveness. The Polite Deny message is maintained by the user in the scheduler's and administrator's profile data record described in FIG. 5 at step 525. The message may then be sent to the trash in step 915. Messages may be deleted (FIG. 16, 1635) from the inbox and sent to the trash (FIG. 16, 1640) in step 915. The trash may be emptied in step 920 (FIG. 16, 1645).

Alternatively, the Polite Deny function may automatically reply to a message. In this automatic mode, a pre-defined or pre-identified set of institutions, colleges, teams, conferences, geographic area, specific sports, people, or specific events (or combinations thereof) may be developed and maintained so that if inquiry from such entities is received, a Polite Deny message is sent. This feature may be useful in those situations where it is already known that a Polite Deny will be issued, if an inquiry or message is received from those other pre-identified entities; perhaps only when the inquiry includes specific parameters such as type of sport or event.

As an alternative or additional feature, an automatic Polite Reply may also be set-up so that it tied to certain time periods, so that if an inquiry comes in during a specified period from the pre-identified entities, for example in November, then a automatic Polite Reply may be that "We will consider your inquiry by January." In this way, by delaying a response to a future date, this "delay" might allow other inquiries to arrive before any decision is made as to which messages/inquires to respond affirmatively or to deny. The "delay" time period may be established based on the pre-identified entities, i.e., each pre-defined entity might have a separate delay period. In this way, a prioritization can be pre-defined to anticipate possible inquiries form different entities so as to gain an improved schedule (e.g., better suited opponents). If however, the incoming inquiry has a deadline attached, then the Polite Reply feature may be inhibited accordingly, or re-set to indicate a "Reply." will be forthcoming by the indicated deadline.

In step 930, a message may be composed (FIG. 16, 1650), and at step 935, a subject entered. At step 940, recipient(s) are selected from a list presented. In step 945, a message may be written. At step 950, a check is made to determine whether all information is valid. At step 955, if valid, the message is sent from one scheduler to the recipients. An example of a message received by the recipient is shown in FIG. 16, 1655. Messages may be replied to the sender in step 927 (FIG. 16, 1660) and forwarded in step 928 (FIG. 16, 1665). Otherwise, the process ends at step 960.

Figure 10:
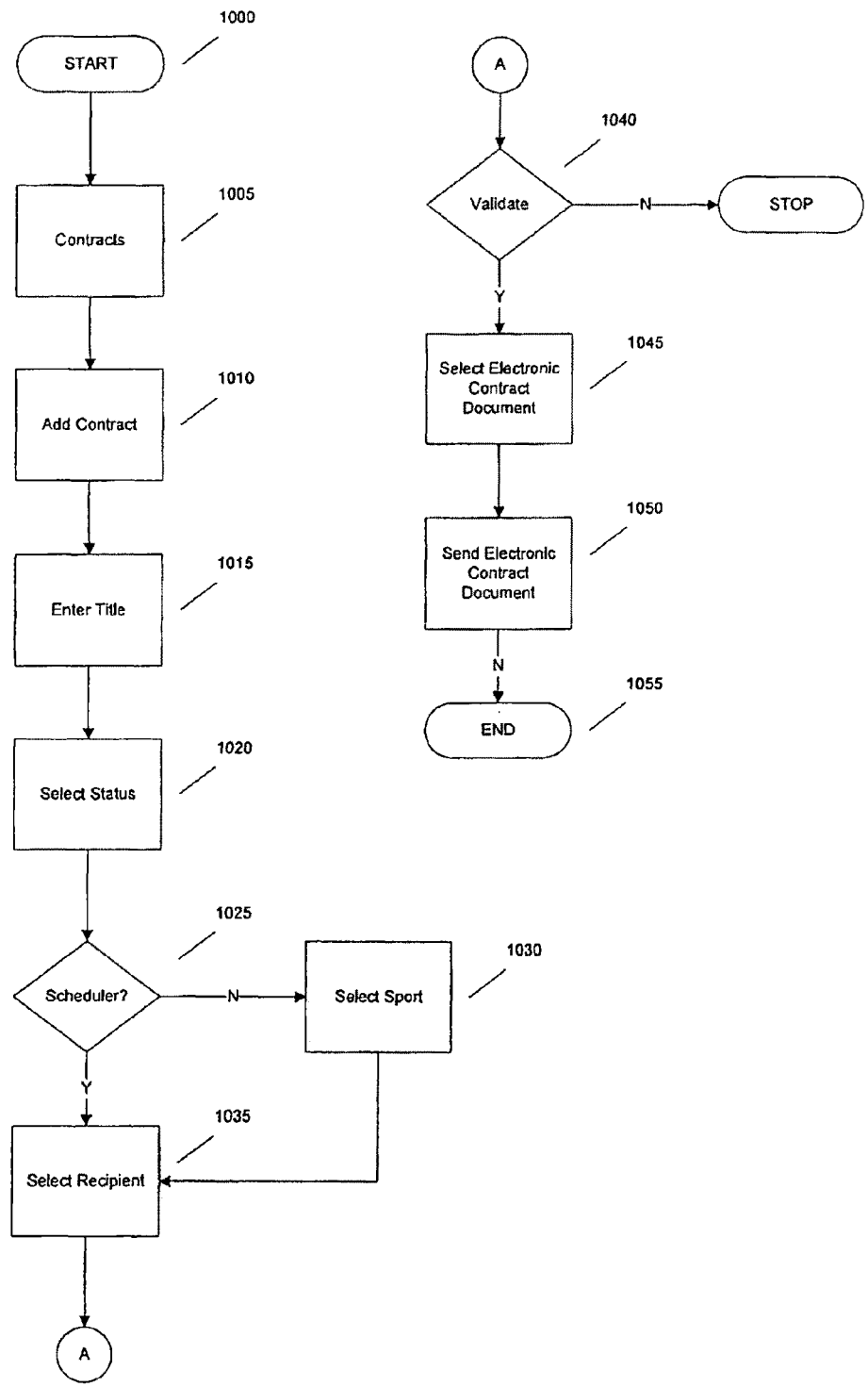
FIG. 10 is a flow diagram of an embodiment showing steps of uploading and sending electronic game contract documents, according to principles of the invention.

FIG. 10 is a flow diagram of an embodiment showing steps of uploading and sending electronic game contract documents, according to principles of the invention, starting at step 1000. At step 1005, the scheduler selects the Contract Manager option. Contract Manager allows institutions the option of an electronic method of transferring contracts as opposed to printing hard copies and mailing. At step 1010, the scheduler adds a contract. At step 1015, a contract title may be entered. At step 1020, the scheduler may select the status of the contract, such as initiated, typically from a selectable list. At step 1025, a check is made whether the user is a scheduler. If not, then at step 1030, a sport may be selected. At step 1035, the user may select the recipient (e.g., individual or office) at the institution that is to receive the electronic contract document. At step 1040, a validation is performed to check if the contract data is accurate and/or complete. If valid and/or complete, the user may select an electronic contract document from the computer's file directory in step 1045 and the electronic contract document is attached to the note. The electronic contract document is sent to the selected recipient in step 1050. The process ends at step 1055.

Using the Invention

The system and methods of the invention may be deployed so that schedulers, administrators, and Associations may be able to communicate in a more timely manner and more efficiently and effectively than they are able to prior to the invention. In certain aspects, the system of the invention improves the speed of communication by networking directly based on schedulers identified to the system. A unified database that maintains overall statuses of subscribing members (e.g., institutions, colleges, conferences, etc.) can simplify and be used to coordinate interactions based on common access to relevant information to make scheduling decisions.

Moreover, the system and methods may provide an improved overall solution to connecting in a social network on a specialized task that involves at least two parties in coordination of a scheduled event or some other coordinated task. This is particularly important when viewed from the fast pace of information flow that the Internet enables and the limited time available to spend on a scheduling task. Moreover, once the network is built to support one task, more applications may be developed to take advantage of the interconnectivity of schedulers and Associations.

Annual membership (or other time period) subscriptions for access to the system by conference offices and/or institutions may be charged, perhaps based on the number of team sports for game search functionality, or as a usage fee. Moreover, fees may be received based on advertising and/or sponsorship for providing access to the coaches or institutions by advertisers or sponsors, perhaps based on type of sport being scheduled, for example. Further, annual memberships for media outlets to view composite schedules by parameters such as sport, sports division, region, conference, etc. may be offered.

While the invention has been described in terms of embodiments, those skilled in the art will recognize that the invention can be practiced with modifications and in the spirit and scope of the appended claims.

We claim:

1. A method for scheduling events, comprising the steps of:
creating an electronic sports schedule database for each of one or more events associated with each of a plurality of differing entities;
activating a schedule manager that displays the one or more events according to permissions to view and update data associated with the one or more events based on a user type, the user type being defined by a profile that indicates that the user type is one of at least four user types comprising a scheduler, an athletic administrator, a sports association and a system administrator, wherein a profile for a scheduler user type includes an indication of a sport;
prompting for a sport if the user type is an athletic administrator or a sports association; and
updating the electronic sports schedule database to indicate an agreement between two of the plurality of differing entities to conduct at least one event of the one or more events on an agreed upon date and location, or to indicate that a date for the prompted sport as unavailable if the user type is one of athletic administrator and sports association;
wherein the electronic sports schedule database is accessible by the plurality of differing entities over a network, and
wherein the steps of creating, activating, prompting and updating are performed by a computer.

2. The method of claim 1, further comprising establishing the profile in the electronic sports database for each of the differing entities.

3. The method of claim 2, wherein the profile is at least partially searchable.

4. The method of claim 1, further comprising adding a new open event date to the electronic sports schedule database by at least one of the plurality of differing entities.

5. The method of claim 4, wherein the step for adding a new open event date includes adding a tournament.

6. The method of claim 1, wherein the differing entities include any of: an institution, an association, a university, a college, a school, a sports conference, and an organization.

7. The method of claim 1, further including searching for at least one of the plurality of differing entities based on criteria, wherein the criteria includes any combination of: geography, power rating, ranking, facilities, organization, type of organization, and specific dates.

8. The method of claim 7, wherein the criteria includes: type of event or type of sport.

9. The method of claim 1, wherein the step for updating the electronic sports schedule database includes:
scheduling an event between the two of the plurality of differing entities by updating the electronic sports schedule database to reflect a date, time and venue.

10. The method of claim 9, further including updating the electronic sports schedule database to indicate a home team.

11. The method of claim 1, further comprising the steps of:
accessing a date manager to identify available open dates;
selecting a sport to be scheduled for one of the open dates; and
updating the open date to reflect a closed date once a sport has been scheduled to maintain the electronic sports schedule database with a current status.

12. The method of claim 1, further comprising searching for at least one of the plurality of different entities based on criteria wherein the step for searching includes:
checking whether the user type is sports association, and if so, prompting for an institution; and
prompting for a type of search including at least any one of: an open search, a parameter search and a quick search, to aid in searching for a potential opponent.

13. The method of claim 12, further comprising receiving a selection in response to the prompt and executing the selected type of search.

14. The method of claim 12, wherein the quick search matches available dates of a searching entity with at least one other potential opponent having the same available date or dates as specified in the quick search, and wherein the parameter search searches based on one or more parameters to limit the search, and the open search searches based on mutually available open dates between at least one potential opponent and the searching entity.

15. The method of claim 1, further comprises charging a subscription fee or usage fee to access the electronic sports schedule database.

16. The method of claim 1, wherein the step for updating keeps the schedules in synchronization between the two of the plurality of differing entities.

17. The method of claim 1, further comprising the step of sending a message as an invitation to schedule one of the one or more events to at least one of the plurality of differing entities.

18. The method of claim 17, further comprising the step of receiving a reply to the sent message, the reply initiated by a Polite Deny function or a Polite Reply function, wherein the Polite Deny and the Polite Reply each are pre-defined messages.

19. The method of claim 18, wherein the Polite Deny function and the Polite Reply function are conditional based on criteria.

20. The method of claim 1, wherein a user type of system administrator permits viewing of all the one or more events by sport, sports association, or institution.

21. The method of claim 1, wherein the user type of sports association permits viewing of all events for all institution members forming the sports association.

22. The method of claim 1, wherein the user type includes a media type.

23. The method of claim 22, wherein the media type indicates a television network.

24. The computer program product of claim 23, wherein the differing entities include one of: an institution, an association, a university, a college, a school, a sports conference, and an organization.

25. A computer program product containing computer logic stored in a computer readable storage medium that when executed performs a computer-implemented method for scheduling sports events, the computer logic configured to perform the steps of:
creating an electronic sports schedule database for each of one or more events associated with each of a plurality of differing entities;
activating a schedule manager that displays the one or more events according to permissions to view and update data associated with the one or more events based on a user type, the user type being defined by a profile that indicates that the user type is one of at least four user types assigned from the group comprising: a scheduler, an athletic administrator, a sports association and a system administrator, wherein a profile for a scheduler user type includes an indication of a sport;

prompting for a sport if the user type is an athletic administrator or a sports association;

updating the electronic sports schedule database to indicate an agreement between two of the plurality of differing entities to conduct at least one event of the one or more events on an agreed upon date and location, or to indicate that a date for the prompted sport as unavailable if the user type is one of athletic administrator and sports association;

wherein the electronic sports schedule database is accessible by the plurality of differing entities over a network, and wherein the creating, activating, prompting and updating are performed by a computer.

* * * * *